(12) United States Patent
Clark et al.

(10) Patent No.: US 7,634,684 B2
(45) Date of Patent: Dec. 15, 2009

(54) INTELLIGENT CONFIGURATION FOR RESTARTING FAILED APPLICATION SERVER INSTANCES

(75) Inventors: Lawrence E. Clark, Cary, NC (US); Stacy R. Joines, Raleigh, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/754,619

(22) Filed: May 29, 2007

(65) Prior Publication Data

US 2008/0301488 A1    Dec. 4, 2008

(51) Int. Cl.
*G06F 11/00* (2006.01)
(52) U.S. Cl. .......................................................... 714/4
(58) Field of Classification Search ............... 714/2–10, 714/12, 13, 15, 16, 20, 21, 23, 24, 31, 37, 714/38

See application file for complete search history.

(56) References Cited

U.S. PATENT DOCUMENTS

| | | | | |
|---|---|---|---|---|
| 5,566,297 | A * | 10/1996 | Devarakonda et al. | 714/15 |
| 6,145,094 | A * | 11/2000 | Shirriff et al. | 714/11 |
| 6,922,796 | B1 * | 7/2005 | Matena et al. | 714/48 |
| 7,249,170 | B2 * | 7/2007 | Tindal et al. | 709/223 |
| 7,251,745 | B2 * | 7/2007 | Koch et al. | 714/11 |
| 7,392,302 | B2 * | 6/2008 | Halpern | 709/223 |
| 2003/0028817 | A1 * | 2/2003 | Suzuyama et al. | 714/4 |
| 2003/0182427 | A1 * | 9/2003 | Halpern | 709/226 |
| 2007/0136393 | A1 * | 6/2007 | Fung et al. | 707/202 |
| 2007/0153691 | A1 * | 7/2007 | Halpern | 370/230 |
| 2007/0174690 | A1 * | 7/2007 | Kambara et al. | 714/13 |
| 2007/0226323 | A1 * | 9/2007 | Halpern | 709/222 |

* cited by examiner

*Primary Examiner*—Nadeem Iqbal
(74) *Attorney, Agent, or Firm*—Hoffman Warnick LLC

(57) ABSTRACT

An improved solution for intelligent configuration for restarting failed application server instances is provided. In an embodiment of the invention, a method for restarting a failed application server instance includes: receiving a notice of a failure of an application server instance; obtaining a cause of the failure; automatically applying at least one configuration change to the application server instance based on the cause; and recovering the application server instance.

26 Claims, 6 Drawing Sheets

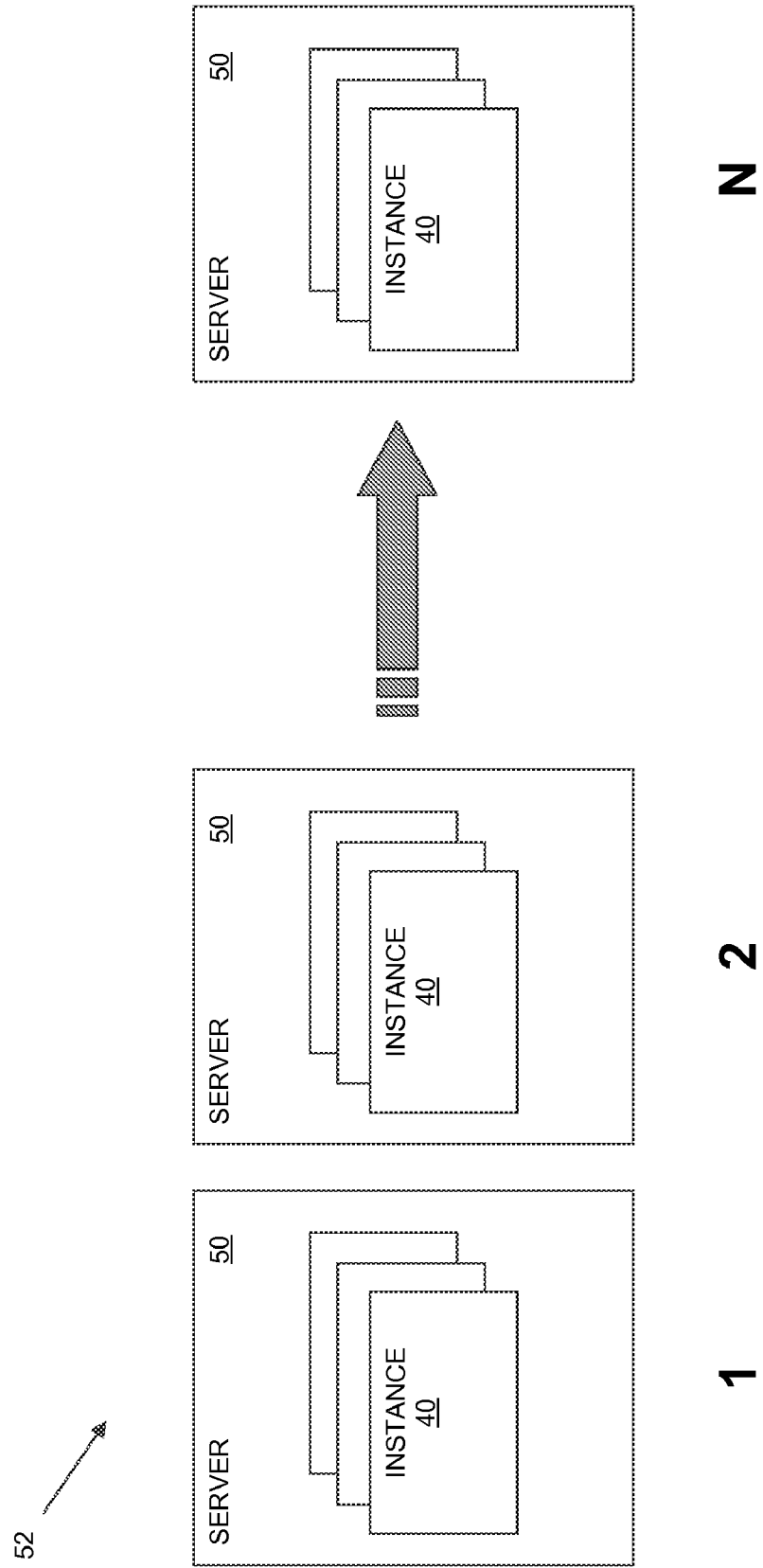

INTELLIGENT CONFIGURATION FOR RESTARTING FAILED APPLICATION SERVER INSTANCES

FIELD OF THE INVENTION

Aspects of the invention relate generally to servers, server farms, and restarting servers after failure instances, and more particularly, to a solution for intelligent configuration for restarting failed application server instances.

BACKGROUND OF THE INVENTION

Application servers, such as Java 2 Enterprise Edition (J2EE) servers, often fail due to problems caused by unexpected increases in workload, new or unexpected usage patterns, or changes in the applications in the server itself. Often the server failures occur because the application server is improperly tuned for these various conditions.

The majority of application server products currently available on the market handle a failure by using an automated restart in response to the failed instance. Restarting the instance with the same tuning values as previously set often results in the same problems recurring, and then another failure, or string of failures. Sometimes this cycle of failing and restarting can result in a "thrash" condition. Often in a server farm environment these failures are exacerbated as they create a cascading effect throughout the entire server farm—one application server fails, thereby increasing workload on the remaining servers. Those remaining servers in turn begin failing due to the increased volume of traffic they receive until the first instance is restarted. Thus, the failure of an instance(s) and the concomitant restart of server(s) is not adequately addressed, nor is there any type of "learning" from the possible patterns of failed instances and restarts.

In view of the foregoing, a need exists to overcome one or more of the deficiencies in the related art.

SUMMARY OF THE INVENTION

Aspects of the invention provide an improved solution for intelligent configuration for restarting a failed application server instance.

A first aspect of the invention provides a method for restarting a failed application server instance, the method comprising: receiving a notice of a failure of an application server instance; obtaining a cause of the failure; automatically applying at least one configuration change to the application server instance based on the cause; and recovering the application server instance.

A second aspect of the invention provides a system for restarting a failed application server instance, the system comprising: a system for receiving a notice of a failure of an application server instance; a system for obtaining a cause of the failure; a system for automatically applying at least one configuration change to the application server instance based on the cause; and a system for recovering the application server instance.

A third aspect of the invention provides a computer program comprising program code stored on a computer-readable medium, which when executed, enables a computer system to implement a method for restarting a failed application server instance, the method comprising: receiving a notice of a failure of an application server instance; obtaining a cause of the failure; automatically applying at least one configuration change to the application server instance based on the cause; and recovering the application server instance.

A fourth aspect of the invention provides a method of generating a system for restarting a failed application server instance, the method comprising: providing a computer system operable to: receive a notice of a failure of an application server instance; obtain a cause of the failure; automatically apply at least one configuration change to the application server instance based on the cause; and recover the application server instance.

A fifth aspect of the invention provides a data processing system for restarting a failed application server instance, comprising: a processing unit; a bus coupled to the processing unit; and a memory medium coupled to the bus comprising program code, which when executed by the processing unit causes the data processing system to: receive a notice of a failure of an application server instance; obtain a cause of the failure; automatically apply at least one configuration change to the application server instance based on the cause; and recover the application server instance.

A sixth aspect of the invention provides computer software embodied in at least one propagated signal for restarting a failed application server instance, the at least one propagated signal comprising instructions for causing at least computer system to: receive a notice of a failure of an application server instance; obtain a cause of the failure; automatically apply at least one configuration change to the application server instance based on the cause; and recover the application server instance.

A seventh aspect of the invention provides a business method for managing restarting a failed application server instance, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which:

FIGS. 2A-2B show illustrative instances wherein the environment shown in FIG. 1 may be employed according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for intelligent configuration for restarting failed application server instances. In an embodiment of the invention, a method for restarting a failed application server instance includes: receiving a notice of a failure of an application server instance; obtaining a cause of the failure; automatically applying at least one configuration change to the application server instance based on the cause; and recovering the application server instance. As used herein, unless otherwise noted, the term "instance" means the whole or portion of at least one of the following: a machine; a partition; a Java Virtual Machine (JVM); and/or an application(s) running within the JVM; the term "set" means one or more (i.e., at least one); and, the phrase "any solution" means any now known or later developed solution.

Figure 1:
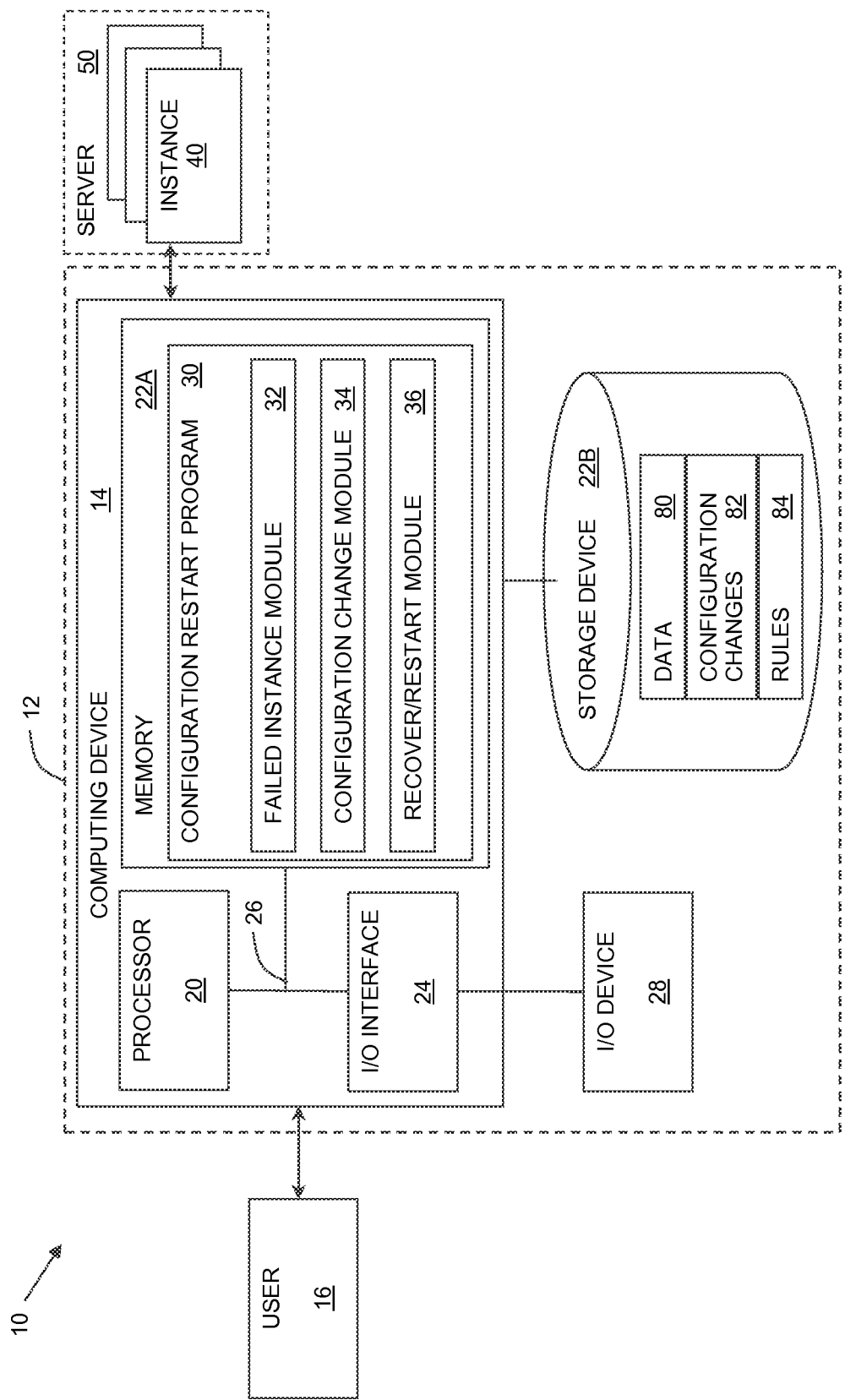
FIG. 1 shows an illustrative environment for employing a method for restarting failed application server instances according to an embodiment of the invention.

Turning to the drawings, FIG. 1 shows an illustrative environment 10 for configuring for restarting failed application server instances according to an embodiment of the invention. To this extent, environment 10 includes a computer system 12 that can perform the process described herein in order to configure for restart failed application server instances. In particular, computer system 12 is shown including a computing device 14 that comprises a configuration restart program 30, which makes computing device 14 operable for configuring for restarting failed application server instances, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as configuration restart program 30, which is stored in a storage system, such as memory 22A and/or storage device 22B. While executing program code, processor 20 can read and/or write data, such as data 80, configuration changes 82, rules 84, etc. to/from memory 22A, storage device 22B, and/or I/O interface 24. Bus 26 provides a communications link between each of the components in computing device 14. I/O device 28 can comprise any device that transfers information between a user 16 and computing device 14 and/or other elements (e.g., instances 40, servers 50, etc.) and computing device 14. To this extent, I/O device 28 can comprise a user I/O device to enable an individual user 16 to interact with computing device 14 and/or a communications device to enable an element, such as an instance 40, server 50, etc. to communicate with computing device 14 using any type of communications link.

In any event, computing device 14 can comprise any general purpose computing article of manufacture capable of executing program code installed thereon. However, it is understood that computing device 14 and configuration restart program 30 are only representative of various possible equivalent computing devices that may perform the process described herein. To this extent, in other embodiments, the functionality provided by computing device 14 and configuration restart program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, configuration restart program 30 enables computer system 12 to configure for restart failed application server instances. To this extent, configuration restart program 30 is shown including a failed instance module 32, a configuration change module 34, and a recover/restart module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 2B:
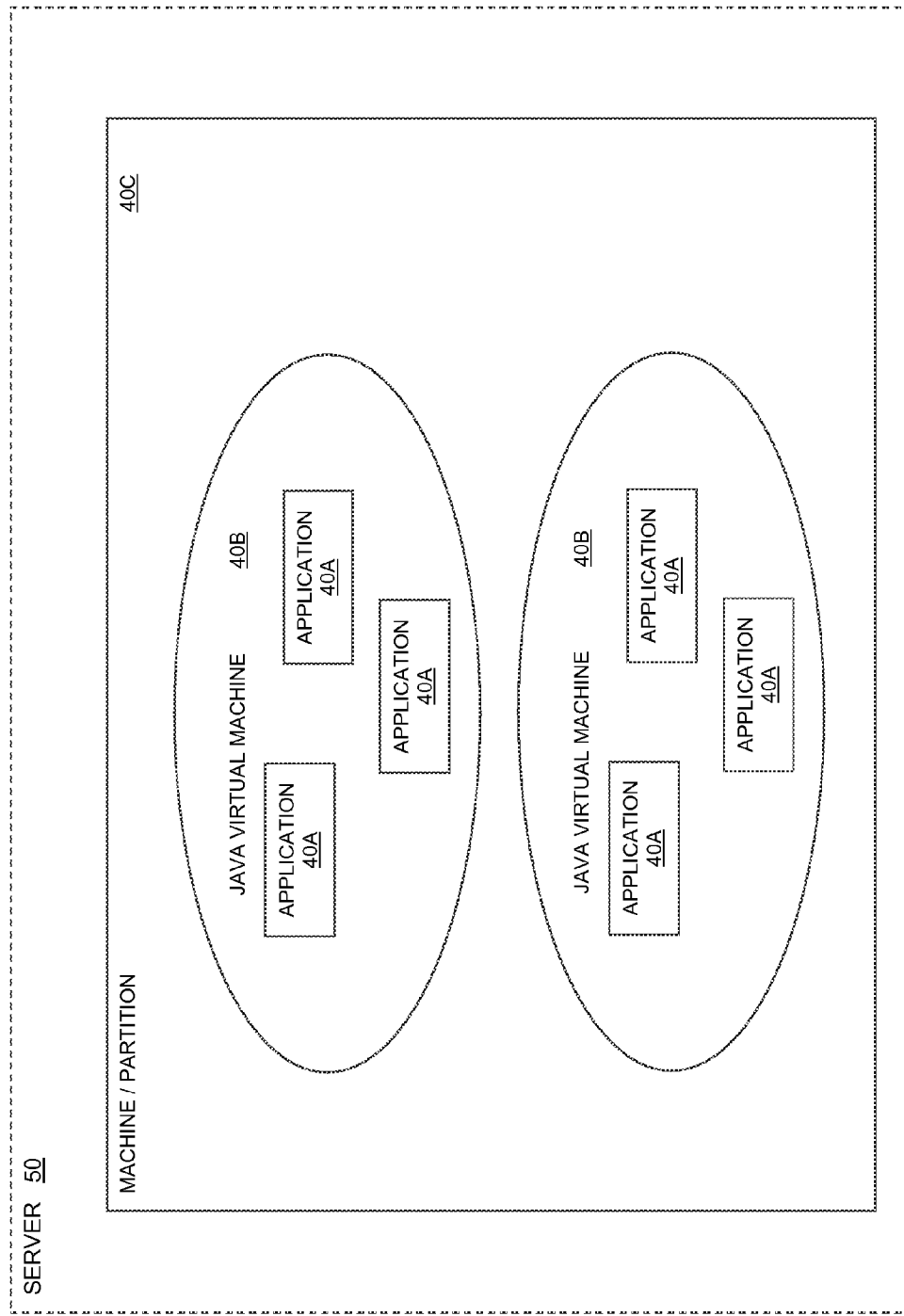
Figure 3:
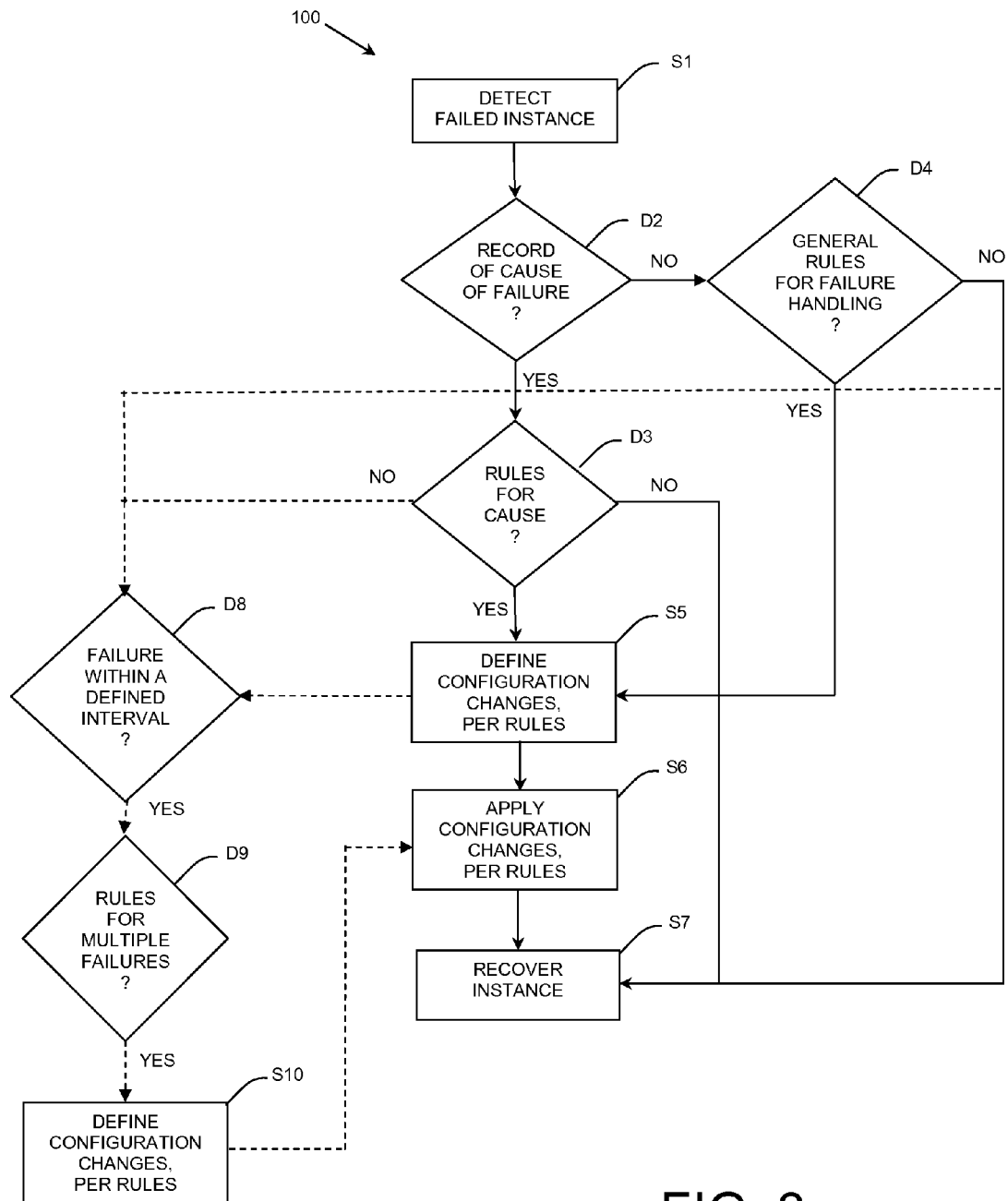
FIG. 3 shows an illustrative data flow for restarting failed application server instances according to an embodiment of the invention.
Figure 4:
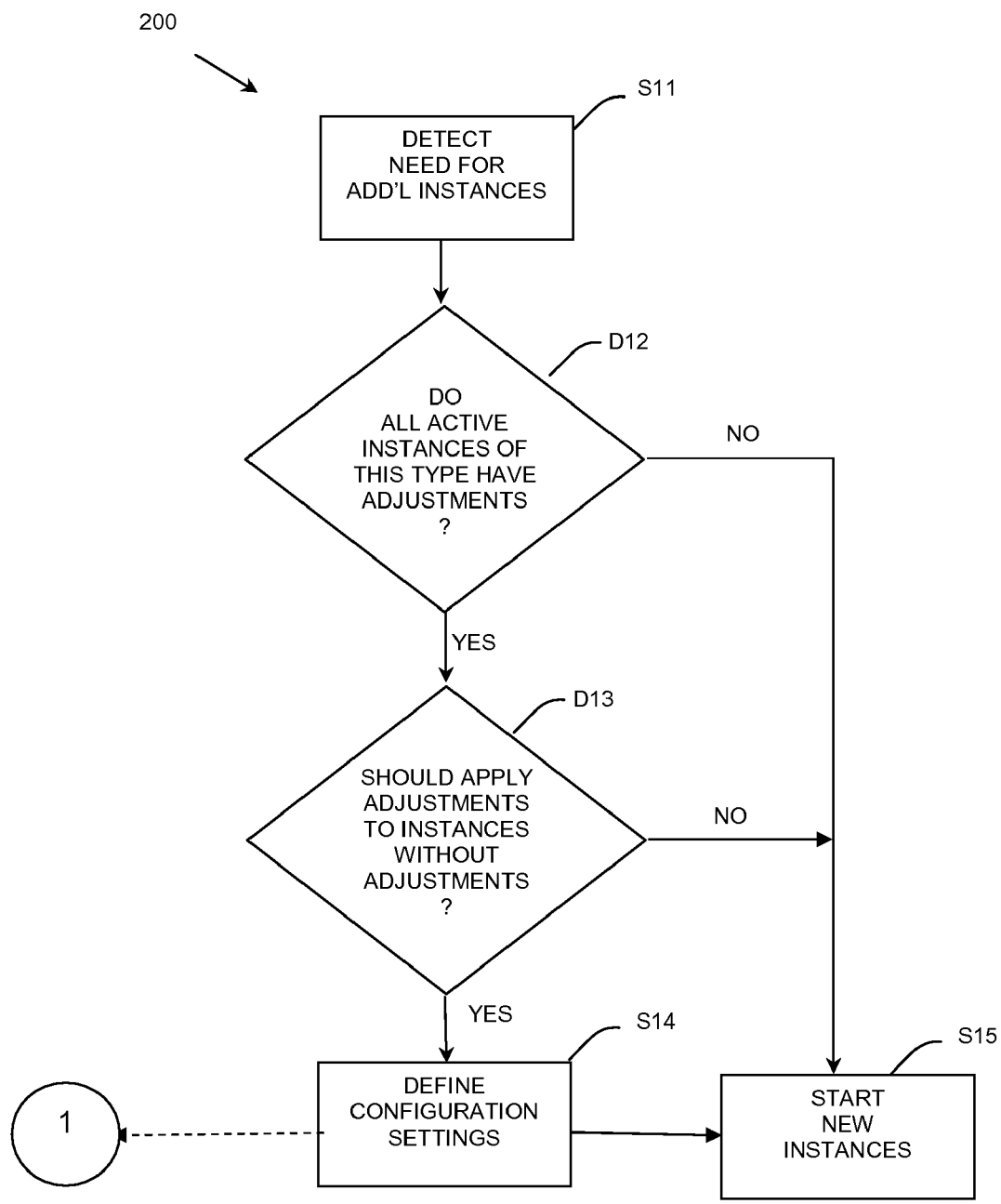
FIG. 4 shows an illustrative data flow for restarting failed application server instances according to another embodiment of the invention.
Figure 5:
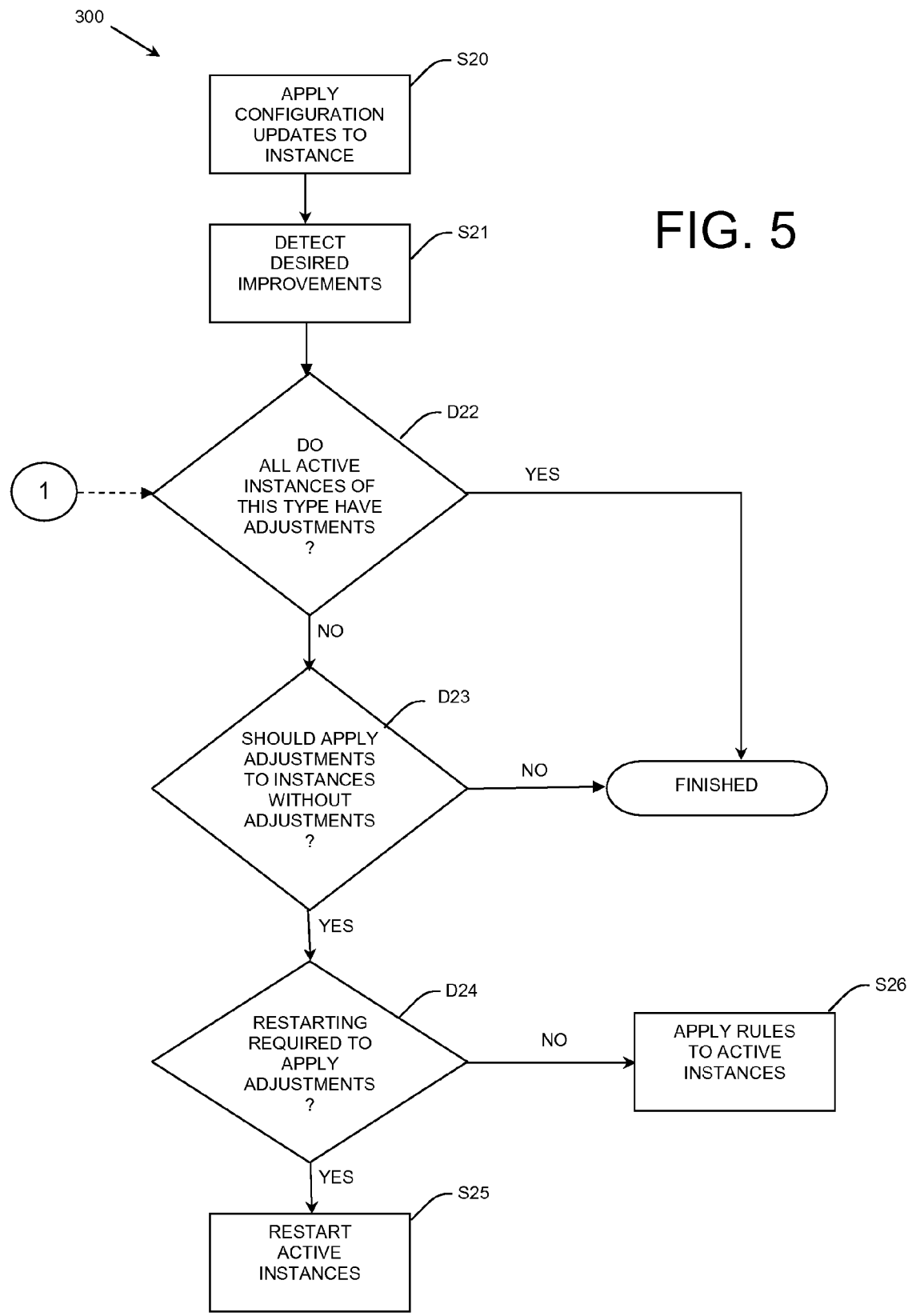
FIG. 5 shows an illustrative data flow for restarting failed application server instances according to another embodiment of the invention.

Aspects of the invention provide an improved solution for configuring for restarting failed application server instances. To this extent, FIGS. 2A-2B show illustrative embodiments of instances 40 for employing the method, and FIGS. 3-5 show various illustrative data flows or methods for using the modules of configuration restart program 30 (FIG. 1), according to embodiments of the invention. For example, the computing device 14 (FIG. 1) may oversee at least one instance 40. FIG. 2A illustrates a schematic diagram of a server farm 52 comprised of a plurality of servers 50 (e.g., "1" through "N") each comprising at least one instance 40 wherein aspects of the present invention may be employed. FIG. 2B illustrates that the instance 40 may vary and comprise one or more elements. The instance 40 may include, but not be limited to, an application 40A, a Java Virtual Machine 40B, and/or a machine/partition 40C. In this manner, aspects of the present invention allow for the configuring for restart a failed application server instance (40A, 40B, and/or 40C) whether it exists amongst a single server 50 or amongst a plurality of servers 50 (e.g., server farm 52 at FIG. 2A).

In another embodiment, the invention provides a method for configuring for restart failed application server instances. As FIG. 3 depicts, the method 100 starts with S1, wherein the failed instance module 32 (FIG. 1) detects at least one failed instance 40 (FIGS. 1, 2). At D2, the method determines if there is a record of the cause of the failed instance(s). If there is no record of the failure cause (i.e., D2 is "No"), then D4 ensues, determining if there are general rules defined for failure handling. Returning back to situations where there exists a record of the failure cause (i.e., D2 is "Yes"), then D3 follows, determining if there are rules 84 (FIG. 1) defined to address the particular cause of failure. If there are neither rules 84 defined to address the particular cause of failure (i.e., D3 is "No") or there are no general rules defined for failure handling (i.e., D4 is "No"), then the method recovers the instance 40 at S7.

Contrastingly, the method proceeds to S5 if either there are rules defined to address the particular cause of failure (i.e., D3 is "Yes") or there are general rules defined for failure handling (i.e., D4 is "Yes"). At S5 the method defines configuration changes 82 (FIG. 1) as specified, or based on, at least one predefined rule 84. S6 calls for the applying of configuration changes 82 as defined by the at least one predefined rule 84. In any event, the method 100 includes the recovering of any instance 40 at S7.

Examples of a specific failure rule 84 (e.g., D3 is "Yes") may comprise if failure="Java Out of Memory" then if current MaxHeap<1 GB, then select smaller of ((maxHeap=currentMaxHeap+100M) or (maxHeap=1 GB)). Another specific failure rule 84 may comprise if failure="GC compaction frequency>=5 seconds" then if current MaxHeap<1 GB, then select smaller of ((maxHeap=currentMaxHeap+100M) or (maxHeap=1 GB)) and if <JVM vendor and version number match> then <apply fragmentation tuning parameters>.

An example of a general rule 84 (e.g., D4 is "Yes") may comprise applying more heap to failing instances 40. For example, if there is a failure, then if current MaxHeap<1 GB, select the smaller of ((maxHeap=currentMaxHeap+100M) or (maxHeap=1 GB)).

Embodiments of the method may include an optional flow that includes D8, D9 and/or S10. The flow may address situations where, for example, a failed instance 40 is repeating and/or recurring in nature. Either after D3 is found to be "No" (i.e., there are no rules defined to address the failure cause); D4 is found to be "No" (i.e., there are no general rules defined for failure handling); and/or, after S5, D8 comprises determining if the failure instance has occurred within a certain interval. The interval may be predefined and/or set. If the failure instance 40 has occurred within an interval (i.e., D8 is "Yes"), then D9 follows and comprises determining if there is a rule(s) 84 defined to address multiple failures within the particular interval of recurrence of the failure. If there is a rule 84 defined to address multiple failures within the particular interval of recurrence of the failure (i.e., D9 is "Yes"), then the method defines configuration changes 82 as specified by, and/or based on, the rule(s) 84 at S10. The optional flow resumes at S6 (i.e., applying configuration changes as defined by the rules).

For example, the flow (e.g., repeated failure "rule") may address a situation such as if application "A" was reported as failing "n" times, then restarting instance 40, yet stop application "A" within the instance 40 and reporting outage to monitoring system. If for example the failure="Java Out of Memory" is reported "n" times, then set heapdump collection parameters and report failure to monitoring system.

In another embodiment, the invention provides a method for configuring for restart failed application server instances 40 that also addresses the cases where additional capacity (e.g., servers and/or instances) is added to the server farm. As FIG. 4 depicts, the method 200 comprises S11 where the configuration restart program 30 detects if there is a need for additional capacity (e.g., additional instances 40 to meet demand). Presuming, in this particular example that there is, D12 comprises determining if the added ("new") instance 40 type requires configuration changes 82 to defaults based on rules 84. If not (i.e., D12 is "No"), then at S15 the new instance(s) 40 are started.

Alternatively, if configuration changes 82 are required (i.e., D12 is "Yes"), then D13 determines if, based on rules 84, the metrics should be applied to the new instance(s) 40. If not (i.e., D13 is "No"), then at S15 the new instance(s) 40 are started. If the metrics should be applied to the new instance(s) 40 (i.e., D13 is "Yes"), then the method 200 defines the configuration settings at S14 and then starts the new instances 40 (S15).

Embodiments of the method may include a flow that includes D22, D23, D24, S25 and/or S26 (See e.g., FIG. 5), as denoted by the dotted line with connector "1". As part of the method 200 and S13, D22 comprises determining if all active instances 40 of this type have these adjustments. If all active instances 40 have the adjustments (i.e., D22 is "Yes"), then the flow is finished. Alternatively, if not all active instances 40 have the adjustments (i.e., D22 is "No"), then at D23 a determination is made as to should, based on the rules 84, the active instances 40 without the adjustments received them now. If not (i.e., D23 is "No"), then the optional flow is finished. If the active instances 40 without adjustments should receive them now (i.e., D23 is "Yes"), then D24 comprises determining if the instances 40 require restarting in order to apply adjustments. If restart is required, at S25 active instances 40 are restarted; conversely, if restart is not required, then at S26 the rules 84 are applied to active instances 40.

In another embodiment, the invention provides a method for configuring for restart failed application server instances that also addresses the cases where the configuration restart program 30 (FIG. 1) proactively makes adjustments to the servers. As FIG. 5 depicts, the method 300 comprises S20 where the configuration restart program 30 applies configuration updates to an instance 40 and at S21 detects desired improvements. D22 determines if all actives instances 40 of this particular type have the desired adjustments. If all active instances 40 do have the desired adjustments (i.e., D22 is "Yes"), then the method 300 is completed.

Contrastingly, if D22 is found to be "No", (i.e., all active instances 40 do not have these adjustments), then D23 follows and comprises determining if the active instances 40 without the adjustments receive them now, based on the rules 84. If the active instances 40 do not receive the adjustments (i.e., D23 is "No"), then similarly the method 300 is finished. Alternatively, if it is determined that the active instances 40 should receive the adjustments (i.e., D23 is "Yes"), then the method determines if the instances 40 require restarting to apply the adjustments at D24. If restart is required (i.e., D24 is "Yes") then at S25 the active instances 40 are restarted; if restart is not required (i.e., D24 is "No") then at S26 the rules 84 are applied to the active instances 40.

This aspect of the method 300 would adequately address, for example, a scenario where Type "Z" instance 40 has been restarted with new rules and checking whether other Type "Z" instances have failed with similar failures. Then based on the interval of failures and/or other metrics, applying the same setting to the other active Type "Z" instances and/or restart Type "Z" instances with the new settings if they cannot be applied to currently running instances.

In another embodiment, the invention provides a computer program stored on a computer-readable medium, which when executed, enables a computer system to configure for restarting failed application server instances. To this extent, the computer-readable medium includes program code, such as configuration restart program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for configuring for restarting failed application server instances. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that configures for restarting failed application server instances, which enables users to perform the process described herein on a subscription, advertising, and/or fee basis. That is, a service provider could offer to manage a network and/or a computer system 12 (FIG. 1) that allows users to configure for restarting failed application server instances as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for restarting a failed application server instance, the method comprising:
   receiving a notice of a failure of an application server instance;
   obtaining a cause of the failure;
   automatically applying at least one configuration change to the application server instance based on the cause; and
   recovering the application server instance.

2. The method of claim 1, wherein the at least one configuration change is specified by a predefined rule.

3. The method of claim 2, wherein the predefined rule comprises determining if the failure is a recurring failure.

4. The method of claim 1, wherein the instance comprises a portion of a Java Virtual Machine (JVM).

5. The method of claim 1, further comprising applying the at least one configuration change to at least one of: a non-failed instance or a new instance of a server.

6. The method of claim 5, the applying further comprising shutting down and restarting the non-failed instance server.

7. The method of claim 1, wherein the cause comprises insufficient Java 2 Enterprise Edition (J2EE) server resources.

8. The method of claim 7, wherein the insufficient J2EE server resources comprise at least one selected from a group consisting of: insufficient memory available to a Java Virtual Machine (JVM), insufficient connections in a Java Database Connectivity (JDBC) connection pool, insufficient connection in a web container pool, and insufficient threads in an object request broker (ORB).

9. The method of claim 1, further comprising applying the at least one configuration change to an added server.

10. The method of claim 1, the recovering including restarting the server.

11. The method of claim 1, further comprising detecting the failure at the application server instance.

12. The method of claim 1, wherein the application server is part of a server farm, and the automatically applying including applying the at least one configuration change to at least one server in the server farm.

13. A system for restarting a failed application server instance, the system comprising:
   a system for receiving a notice of a failure of an application server instance;
   a system for obtaining a cause of the failure;
   a system for automatically applying at least one configuration change to the application server instance based on the cause; and
   a system for recovering the application server instance.

14. The system of claim 13, wherein the at least one configuration change is specified by a predefined rule.

15. The system of claim 14, wherein the predefined rule comprises determining if the failure is a recurring failure.

16. The system of claim 13, wherein the instance comprises a portion of a Java Virtual Machine (JVM).

17. The system of claim 13, further comprising a system for applying the at least one configuration change to at least one of: a non-failed instance or a new instance of a server.

18. The system of claim 17, the system for applying further comprising a system for shutting down and restarting the non-failed instance server.

19. The system of claim 13, wherein the cause comprises insufficient Java 2 Enterprise Edition (J2EE) server resources.

20. The system of claim 19, wherein the insufficient J2EE server resources comprise at least one selected from a group consisting of: insufficient memory available to a Java Virtual Machine (JVM), insufficient connections in a Java Database Connectivity (JDBC) connection pool, insufficient connection in a web container pool, and insufficient threads in an object request broker (ORB).

21. The system of claim 13, further comprising a system for applying the at least one configuration change to an added server.

22. The system of claim 13, the system for recovering including a system for restarting the server.

23. The system of claim 13, further comprising a system for detecting the failure.

24. The system of claim 13, wherein the application server is part of a server farm, and the system for automatically applying including a system for applying the at least one configuration change to at least one server in the server farm.

25. A computer program comprising program code stored on a computer-readable medium, which when executed, enables a computer system to implement a method for restarting a failed application server instance, the method comprising:

receiving a notice of a failure of an application server instance;

obtaining a cause of the failure;

automatically applying at least one configuration change to the application server instance based on the cause; and recovering the application server instance.

26. A method of generating a system for restarting a failed application server instance, the method comprising:

providing a computer system operable to:

receive a notice of a failure of an application server instance;

obtain a cause of the failure;

automatically apply at least one configuration change to the application server instance based on the cause; and recover the application server instance.

\* \* \* \* \*